United States Patent
Sasaki et al.

(10) Patent No.: US 12,358,573 B2
(45) Date of Patent: Jul. 15, 2025

(54) VEHICLE REAR STRUCTURE

(71) Applicant: HONDA MOTOR CO., LTD., Tokyo (JP)

(72) Inventors: Takuya Sasaki, Tokyo (JP); Toshihiro Yamaguchi, Tokyo (JP); Kyosuke Yamakita, Tokyo (JP); Takashi Nitta, Tokyo (JP); Dai Kamata, Tokyo (JP); Yusuke Miura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 420 days.

(21) Appl. No.: 18/079,095

(22) Filed: Dec. 12, 2022

(65) Prior Publication Data

US 2023/0264763 A1 Aug. 24, 2023

(30) Foreign Application Priority Data

Feb. 21, 2022 (JP) ................................ 2022-024968

(51) Int. Cl.
*B62D 43/10* (2006.01)
*B62D 25/08* (2006.01)
*B62D 25/20* (2006.01)

(52) U.S. Cl.
CPC ............. *B62D 43/10* (2013.01); *B62D 25/08* (2013.01); *B62D 25/20* (2013.01)

(58) Field of Classification Search
CPC .... B62D 21/152; B62D 25/08; B62D 25/087; B62D 25/20; B62D 43/10
See application file for complete search history.

(56) References Cited

U.S. PATENT DOCUMENTS

| 8,091,941 B2 * | 1/2012 | Asou ...................... B62D 43/10 |
| | | 296/187.11 |
| 8,308,215 B2 * | 11/2012 | Souma ................. B62D 21/152 |
| | | 296/187.11 |
| 2004/0031826 A1 | 2/2004 | Zum Mallen et al. |
| 2011/0155772 A1 | 6/2011 | Souma et al. |

(Continued)

FOREIGN PATENT DOCUMENTS

| JP | 2011-111026 | 6/2011 |
| JP | 2011-131711 | 7/2011 |

(Continued)

OTHER PUBLICATIONS

Japanese Office Action for Japanese Patent Application No. 2022-024968 mailed Sep. 12, 2023.

(Continued)

*Primary Examiner* — Lori Lyjak
(74) *Attorney, Agent, or Firm* — Amin, Turocy & Watson, LLP

(57) ABSTRACT

A vehicle rear structure includes a spare tire bracket which has a longer rear section than a front section thereof in the vehicle with respect to a spare tire fixing portion, a spare tire fixed to the spare tire fixing portion, and reinforcement member having a second inclination reinforcing portion extending upward from a rear section of a rear floor pan towards the front of the vehicle. The spare tire bracket has a first easy bending section provided behind the spare tire fixing portion in the vehicle. The reinforcement member has a second easy bending section provided behind the spare tire fixing portion in the vehicle.

9 Claims, 13 Drawing Sheets

(56) References Cited

U.S. PATENT DOCUMENTS

2011/0156431  A1*  6/2011  Souma ................ B62D 21/152
                                                 296/37.2
2021/0107574  A1   4/2021  Okamura et al.

FOREIGN PATENT DOCUMENTS

JP      2015-093617      5/2015
JP      2021-062784      4/2021

OTHER PUBLICATIONS

Japanese Office Action for Japanese Patent Application No. 2022-024968 mailed Jun. 13, 2023.

* cited by examiner

VEHICLE REAR STRUCTURE

CROSS-REFERENCE TO RELATED APPLICATION

Priority is claimed on Japanese Patent Application No. 2022-024968, filed Feb. 21, 2022, the content of which is incorporated herein by reference.

BACKGROUND OF THE INVENTION

Field of the Invention

The present invention relates to a vehicle rear structure.

Description of Related Art

As a vehicle rear structure, a structure in which a reinforcement member is connected to a lower surface of a loaded object accommodating section in a forward/rearward direction of a vehicle body and a towing hook is provided on a rear end portion of the reinforcement member is known. The reinforcement member has a fragile section (i.e., an easy bending section) provided close to the towing hook. A second fragile section (i.e., a second easy bending section) is provided in front of the fragile section in the vehicle body.

In the vehicle rear structure, for example, the reinforcement member is bent at the fragile section and the second fragile section by an impact load input upon a rear end collision. For this reason, bending of the reinforcement member by the impact load can be controlled and the impact load can be absorbed by the reinforcement member. Accordingly, it is possible to suppress an influence on the loaded object accommodated in the loaded object accommodating section or a rear seat provided in front of the loaded object accommodating section of the vehicle body (for example, see Japanese Unexamined Patent Application, First Publication No. 2015-93617).

In addition, as the vehicle rear structure, a structure in which the reinforcement member is connected to a lower surface of a spare tire house (which may hereinafter be referred to as a rear floor pan) in the forward/rearward direction of the vehicle body and the towing hook is provided on a rear end portion of the reinforcement member is known. A spare tire is inclined and disposed in the rear floor pan via a spare tire bracket while being tilted forward such that a rear section is located above a front section. The reinforcement member is divided into a reinforcement member front section and a reinforcement member rear section. The reinforcement member is bent in a convex shape directed downward at the division position between the reinforcement member front section and the reinforcement member rear section by the impact load input upon, for example, a rear end collision. Accordingly, the impact load is absorbed by the reinforcement member.

In the vehicle rear structure, the rear floor pan is deformed by the impact load input due to the rear end collision, and thus the spare tire that is tilted forward is separated from the spare tire bracket (i.e., the rear floor pan). In this state, the rear section of the spare tire is flipped up about the front section. In this way, a behavior (movement) of the spare tire is controlled such that the spare tire is pivoted forward in the vehicle, and thus it is possible to prevent the spare tire from coming in contact with the rear seat (for example, see Japanese Unexamined Patent Application, First Publication No. 2011-111026).

SUMMARY OF THE INVENTION

However, in the vehicle rear structure of Japanese Unexamined Patent Application, First Publication No. 2015-93617, when the impact load is absorbed as the reinforcement member is bent by the impact load, the loaded object is separated from the loaded object accommodating section. For this reason, it is difficult to appropriately control movement of the loaded object.

For example, assuming that the spare tire is loaded as the loaded object in the loaded object accommodating section (a so-called rear floor pan), when the impact load is absorbed, the spare tire is separated from the loaded object accommodating section. For this reason, it is difficult to appropriately control movement of the spare tire and to achieve improvement of safety of the vehicle.

In the vehicle rear structure of Japanese Unexamined Patent Application, First Publication No. 2011-111026, when the impact load is absorbed by bending the reinforcement member due to the impact load, the spare tire is separated from the rear floor pan. For this reason, it is difficult to appropriately control movement of the spare tire and to achieve improvement of safety of the vehicle.

An aspect of the present invention is directed to providing a vehicle rear structure capable of improving safety of a vehicle by flipping up a rear section of a spare tire without separating the spare tire from a rear floor pan when an impact load is input from behind a vehicle body.

An aspect of the present invention proposes the following configurations.

(1) A vehicle rear structure according to the present invention includes a rear floor pan (for example, a rear floor pan 15 of an embodiment); a spare tire bracket (for example, a spare tire bracket 16 or 102 of the embodiment) provided on an upper surface of the rear floor pan and which has a longer rear section than a front section thereof in the vehicle with respect to a spare tire fixing portion (for example, a spare tire fixing portion 51 of the embodiment); a spare tire fixed to the spare tire fixing portion (for example, a spare tire 17 of the embodiment); a reinforcement member (for example, a reinforcement member 18 or 103 of the embodiment) having an inclined portion (for example, a second inclination reinforcing portion 63 of the embodiment) that is provided on a lower surface of the rear floor pan and that extends upward from a rear section (for example, a rear section 15*d* of the rear floor pan of the embodiment) of the rear floor pan towards the front of the vehicle; and a hook (for example, a towing hook 21 of the embodiment) provided on a rear section (for example, a rear section 18*b* of the reinforcement member of the embodiment) of the reinforcement member, the spare tire bracket has a first easy bending section (for example, a first easy bending section 47 or 105 of the embodiment) provided behind the spare tire fixing portion in the vehicle, to which the spare tire is fixed, and the reinforcement member has a second easy bending section (for example, a second easy bending section 62 or 106 of the embodiment) provided behind the spare tire fixing portion in the vehicle.

According to the above-mentioned configuration of the aspect of the above-mentioned (1), for example, when an impact load is input to the hook due to a rear end collision, an upward load is input to the inclined portion of the reinforcement member toward the front of the vehicle. For this reason, the first easy bending section and the second easy bending section can be bent upward by the upward load input to the inclined portion. Accordingly, the load input to the inclined portion of the reinforcement member can be absorbed by the reinforcement member, the spare tire bracket 16 or the like.

Here, the first easy bending section and the second easy bending section are provided behind the spare tire fixing portion in the vehicle. In addition, the spare tire bracket is formed to have a longer rear section than the front section thereof in the vehicle with respect to the spare tire fixing portion, and thus an area on the rear in the vehicle is strongly provided on the rear floor pan.

For this reason, when the first easy bending section and the second easy bending section are bent upward by the upward load input to the inclined portion, the spare tire fixing portion can be prevented from being separated from the rear floor pan. Accordingly, the rear side of the spare tire fixing portion of the vehicle can be flipped upward together with the rear floor pan.

Accordingly, when the impact load is input from behind the vehicle body, in a state in which the spare tire is fixed to the spare tire fixing portion, it is possible to flip the rear section of the spare tire upward without separating the spare tire from the rear floor pan. Accordingly, a behavior (movement) of the spare tire can be appropriately controlled such that the spare tire pivots toward the front of the vehicle, and for example, the spare tire can be prevented from coming into contact with a rear seat. Accordingly, safety of the vehicle can be improved.

(2) In the aspect of the above-mentioned (1), the first easy bending section and the second easy bending section may be fragile sections.

The fragile sections can be easily formed by, for example, a folded portion, a notch, a hole portion, a thin portion, or the like. In this way, the first easy bending section and the second easy bending section are provided as the fragile sections, and thus the first easy bending section and the second easy bending section can be formed in a simple shape at a low cost.

(3) In the aspect of the above-mentioned (1), the first easy bending section and the second easy bending section may be provided at a same position in a vehicle forward/rearward direction.

According to the configuration of the aspect of the above-mentioned (3), when the upward load is input to the inclined portion of the reinforcement member toward the front of the vehicle, in the spare tire bracket and the reinforcement member, stress can be concentrated on the same position (i.e., the first easy bending section and the second easy bending section) in the vehicle forward/rearward direction. For this reason, the spare tire bracket and the reinforcement member can be reliably (appropriately) bent together with the rear floor pan at behind the spare tire fixing portion in the vehicle. Accordingly, it is possible to reliably (appropriately) flip the rear section of the spare tire upward without separating the spare tire from the rear floor pan, and safety of the vehicle can be reliably improved.

(4) In the aspect of the above-mentioned (3), the first easy bending section and the second easy bending section may be disposed on arcs (for example, a first arc 71 and a second arc 72 of the embodiment) having the same center (for example, the same center O1 of the embodiment) and disposed on the same normal line (for example, the same normal line 73 of the embodiment).

According to the configuration of the above-mentioned (4), when the upward load is input to the inclined portion of the reinforcement member toward the front of the vehicle, stress can be concentrated on the first easy bending section and the second easy bending section on the same normal line in the spare tire bracket and the reinforcement member. For this reason, the spare tire bracket and the reinforcement member can be reliably (appropriately) bent together with the rear floor pan at behind the spare tire fixing portion of the vehicle. Accordingly, it is possible to reliably (appropriately) flip the rear section of the spare tire upward while not separating the spare tire from the rear floor pan.

(5) In the aspect of the above-mentioned (1), the first easy bending section and the second easy bending section may be provided at positions deviated in the vehicle forward/rearward direction.

According to the aspect of the above-mentioned (5), when the upward load is input to the inclined portion of the reinforcement member toward the front of the vehicle, places on which stress is concentrated can be distributed in the spare tire bracket and the reinforcement member in the vehicle forward/rearward direction. For this reason, rigidity can be reliably secured in whole of the spare tire bracket, the reinforcement member, and the rear floor pan. Accordingly, a reaction force that supports the upward load input to the inclined portion of the reinforcement member can be appropriately secured.

In this state, when the load exceeds the reaction force, the spare tire bracket is bent at the first easy bending section. Accordingly, the reinforcement member can be bent at the second easy bending section. Accordingly, the load input to the inclined portion of the reinforcement member can be absorbed by the spare tire bracket, the reinforcement member, and the rear floor pan.

Meanwhile, the spare tire bracket is bent at the first easy bending section, and the reinforcement member is bent at the second easy bending section. Accordingly, the spare tire bracket and the reinforcement member can be reliably (appropriately) bent together with the rear floor pan at behind the spare tire fixing portion of the vehicle.

For this reason, it is possible to reliably (appropriately) flip the rear section of the spare tire upward while not separating the spare tire from the rear floor pan.

(6) In the aspect of the above-mentioned (5), the first easy bending section and the second easy bending section may be disposed on arcs (for example, a first arc 111 and a second arc 112 of the embodiment) having the same center (for example, the same center O2 of the embodiment) and disposed on deviated normal lines (for example, a first normal line 114 and a second normal line 115 of the embodiment).

According to the above-mentioned configuration, when the upward load is input to the inclined portion of the reinforcement member toward the front of the vehicle, places on which stress is concentrated can be distributed in the spare tire bracket and the reinforcement member in the vehicle forward/rearward direction. For this reason, rigidity can be appropriately secured in whole of the spare tire bracket, the reinforcement member, and the rear floor pan. Accordingly, a reaction force that supports the upward load input to the inclined portion of the reinforcement member can be appropriately secured.

In this state, when the load exceeds the reaction force, the spare tire bracket is bent at the first easy bending section. Accordingly, the reinforcement member can be bent at the second easy bending section. For this reason, the load input to the inclined portion of the reinforcement member can be absorbed by the spare tire bracket, the reinforcement member, and the rear floor pan.

Meanwhile, the spare tire bracket is bent at the first easy bending section, and the reinforcement member is bent at the second easy bending section. Accordingly, the spare tire bracket and the reinforcement member can be reliably (appropriately) bent together with the rear floor pan at behind the spare tire fixing portion of the vehicle.

For this reason, it is possible to reliably (appropriately) flip the rear section of the spare tire upward while not separating the spare tire from the rear floor pan.

(7) In the aspect of the above-mentioned (1), the first easy bending section and the second easy bending section may be provided on a ridge portion (for example, a floor pan ridge portion 33 of the embodiment) extending in the rear floor pan in a vehicle width direction.

According to the configuration of the aspect of the above-mentioned (7), the ridge portion can be provided at behind the spare tire fixing portion of the vehicle. For this reason, when the spare tire bracket is bent at the first easy bending section and the reinforcement member is bent at the second easy bending section by the load input to the inclined portion of the reinforcement member, the rear floor pan can be bent at the ridge portion provided at behind the spare tire fixing portion of the vehicle.

Accordingly, the spare tire fixing portion can be prevented from being separated from the rear floor pan, and the rear side of the spare tire fixing portion of the vehicle can be flipped upward more reliably together with the rear floor pan. Accordingly, in a state in which the spare tire is fixed to the spare tire fixing portion, the spare tire is not separated from the rear floor pan, and the rear section of the spare tire can be flipped upward.

(8) In the aspect of the above-mentioned (1), the vehicle rear structure includes a pair of rear side frames (for example, left and right rear side frames 11 and 12 of the embodiment) extending in a vehicle forward/rearward direction while being provided on an outer side of the rear floor pan in a vehicle width direction; and a rear cross member (for example, a floor pan cross member 22 of the embodiment) that extends in the vehicle width direction so as to bridge the pair of rear side frames and that is provided on a lower surface of the rear floor pan, an area (for example, a connecting area 61*b* of the embodiment) of the reinforcement member on the front side of the vehicle with respect to the inclined portion may be connected to the rear cross member.

According to the configuration of the aspect of the above-mentioned (8), the area of the reinforcement member in front with respect to the inclined portion in the vehicle can be reinforced by the rear cross member. For this reason, a reaction force that supports the upward load input to the inclined portion of the reinforcement member can be appropriately secured by the reinforcement member, and the reinforcement member can be provided between the hook and the rear cross member with tension being applied. In this state, when the load exceeds the reaction force, the spare tire bracket can be reliably bent at the first easy bending section, and the reinforcement member can be reliably bent at the second easy bending section. Accordingly, it is possible to reliably flip the rear section of the spare tire upward while not separating the spare tire from the rear floor pan.

(9) In the aspect of the above-mentioned (1), the reinforcement member may have a third easy bending section (for example, a third easy bending section 64 of the embodiment) that is provided at behind the second easy bending section in the vehicle and that is formed with a fragile section.

For example, it is conceivable that the impact load due to the rear end collision is input horizontally toward the front of the vehicle. In this case, it is conceivable that the upward load input to the inclined portion of the reinforcement member becomes small. Here, the third easy bending section is provided rearward than the second easy bending section of the reinforcement member in the vehicle. For this reason, even when the upward load input to the inclined portion of the reinforcement member is reduced, the second easy bending section can be bent to be folded in a Z shape by bending the third easy bending section.

Accordingly, the second easy bending section can be moved upward together with the first easy bending section of the spare tire bracket. Accordingly, in a state in which the spare tire is fixed to the spare tire fixing portion, it is possible to flip the rear section of the spare tire upward while not separating the spare tire from the rear floor pan.

According to the aspect of the present invention, when the impact load is input from behind the vehicle body, it is possible to flip the rear section of the spare tire upward while not separating the spare tire from the rear floor pan. For this reason, safety of the vehicle can be improved.

DETAILED DESCRIPTION OF THE INVENTION

Figure 1:
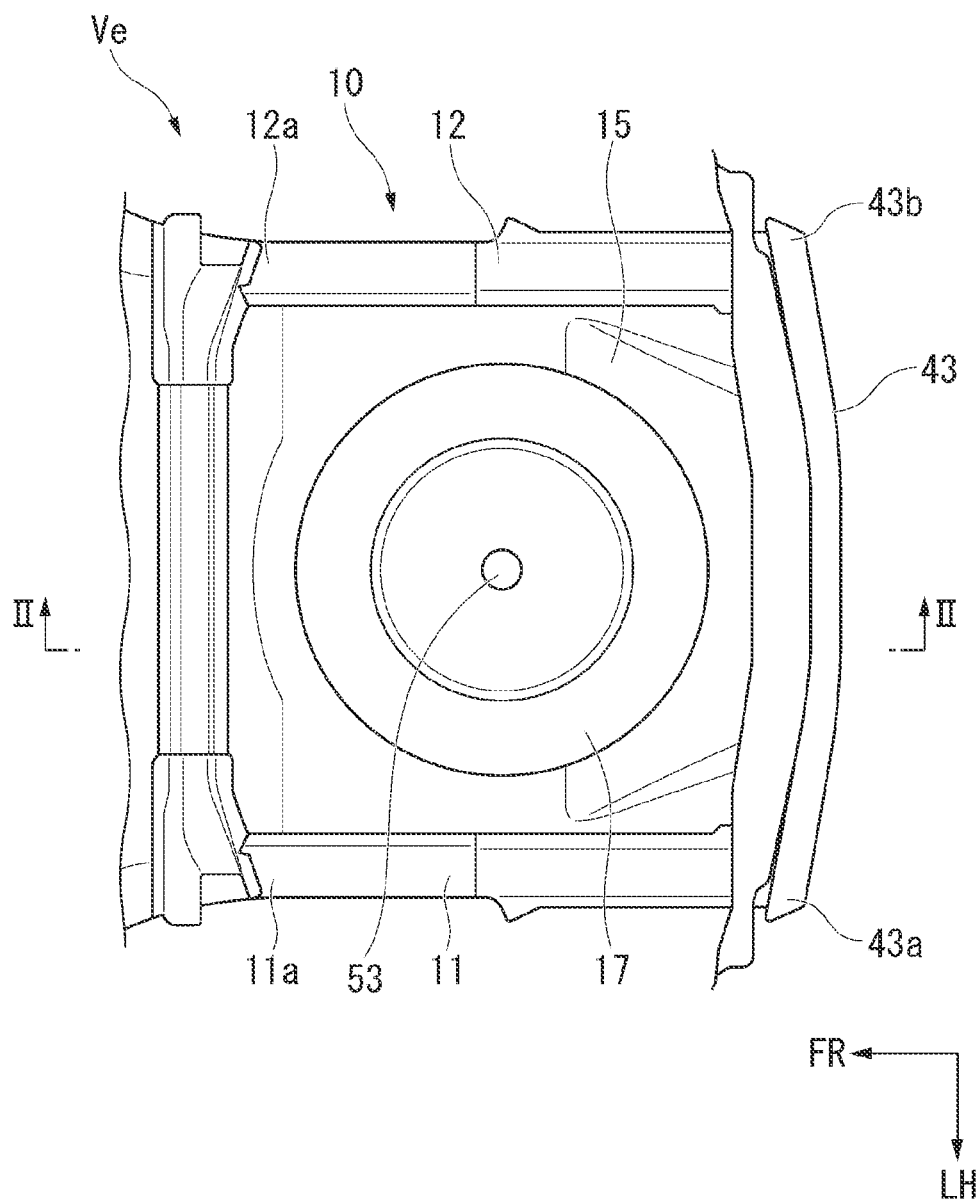
FIG. 1 is a plan view showing a vehicle rear structure according to an embodiment of the present invention.

Hereinafter, a vehicle rear structure according to an embodiment of the present invention will be described with reference to the accompanying drawings. In the drawings, an arrow FR indicates a forward direction of a vehicle, an arrow UP indicates an upward direction of the vehicle, and an arrow LH indicates a leftward direction of the vehicle.

Embodiment

<Vehicle Rear Structure>

Figure 2:
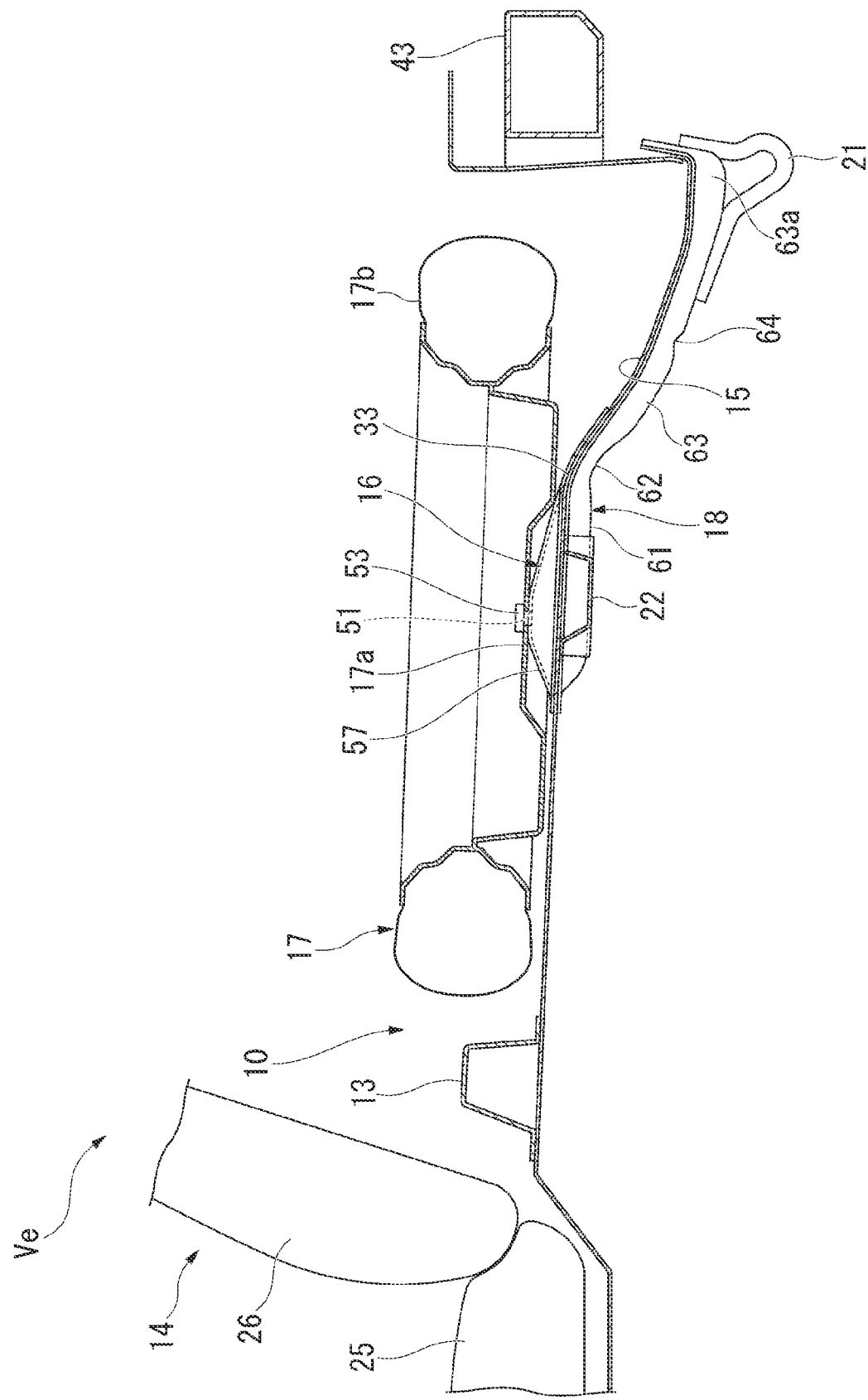
FIG. 2 is a cross-sectional view along line II-II of FIG. 1.

FIG. 1 is a plan view showing a vehicle rear structure 10 according to the embodiment. FIG. 2 is a cross-sectional view along line II-II of FIG. 1.

As shown in FIG. 1 and FIG. 2, a vehicle Ve is, for example, a sport utility vehicle (SUV), and a trailer hitch TH (see FIG. 10) may be attached to a rear end portion thereof. The trailer hitch TH is, for example, a device configured to tow a trailer loaded with a fishing board, a camping trailer, or the like. In FIG. 1 to FIG. 6, the vehicle Ve will be described in a state in which the trailer hitch TH is not attached thereto.

The vehicle Ve includes the vehicle rear structure 10 that substantially constitutes a rear half portion of the vehicle Ve. Specifically, the vehicle rear structure includes left and right rear side frames (a pair of rear side frames) 11 and 12, a rear floor cross member 13 provided on a vehicle body rear section, a rear seat 14 provided in front of the rear floor cross member 13 in the vehicle body, a rear floor pan 15 provided at behind the rear floor cross member 13 in the vehicle body, a spare tire bracket 16 (see FIG. 3) provided on an upper surface of the rear floor pan 15, a spare tire 17 provided on a front section of the rear floor pan 15 in the vehicle body, a reinforcement member 18 and a floor pan cross member (rear cross member) 22 provided on a lower surface of the rear floor pan 15 (see FIG. 5), and a towing hook (hook) 21 provided on the reinforcement member 18.

The left rear side frame 11 and the right rear side frame 12 are provided on an outer side of the vehicle body rear section in the vehicle width direction (i.e., left right outer sides). The left rear side frame 11 and the right rear side frame 12 are, for example, high rigidity frame members formed in a hollow closed cross section to form a part of the vehicle body frame.

The left rear side frame 11 extends rearward from a rear end portion of a left side sill (not shown) of the vehicle body. The right rear side frame 12 extends rearward from a rear end portion of a right side sill (not shown) of the vehicle body.

The rear floor cross member 13 bridges between a front end portion 11a of the left rear side frame 11 and a front end portion 12a of the right rear side frame 12. The rear floor cross member 13 is a high rigidity frame member extending in the vehicle width direction and constitutes a part of the vehicle body frame.

For example, the rear seat 14 is provided in front of the rear floor cross member 13 of the vehicle body and between a left side sill and a right side sill. The rear seat 14 includes a seat cushion 25, a seat back 26, and a headrest (not shown).

The seat cushion 25 is a seat section provided between the left side sill and the right side sill and on which an occupant sits. The seat back 26 is a backrest standing up from a rear section of the seat cushion 25 and configured to support the back of the occupant who is sitting on the seat cushion 25. The headrest is a head rest section provided on an upper portion of the seat back 26 and configured to support the head of the occupant who is sitting on the seat cushion 25.

<Rear Floor Pan>

Figure 3:
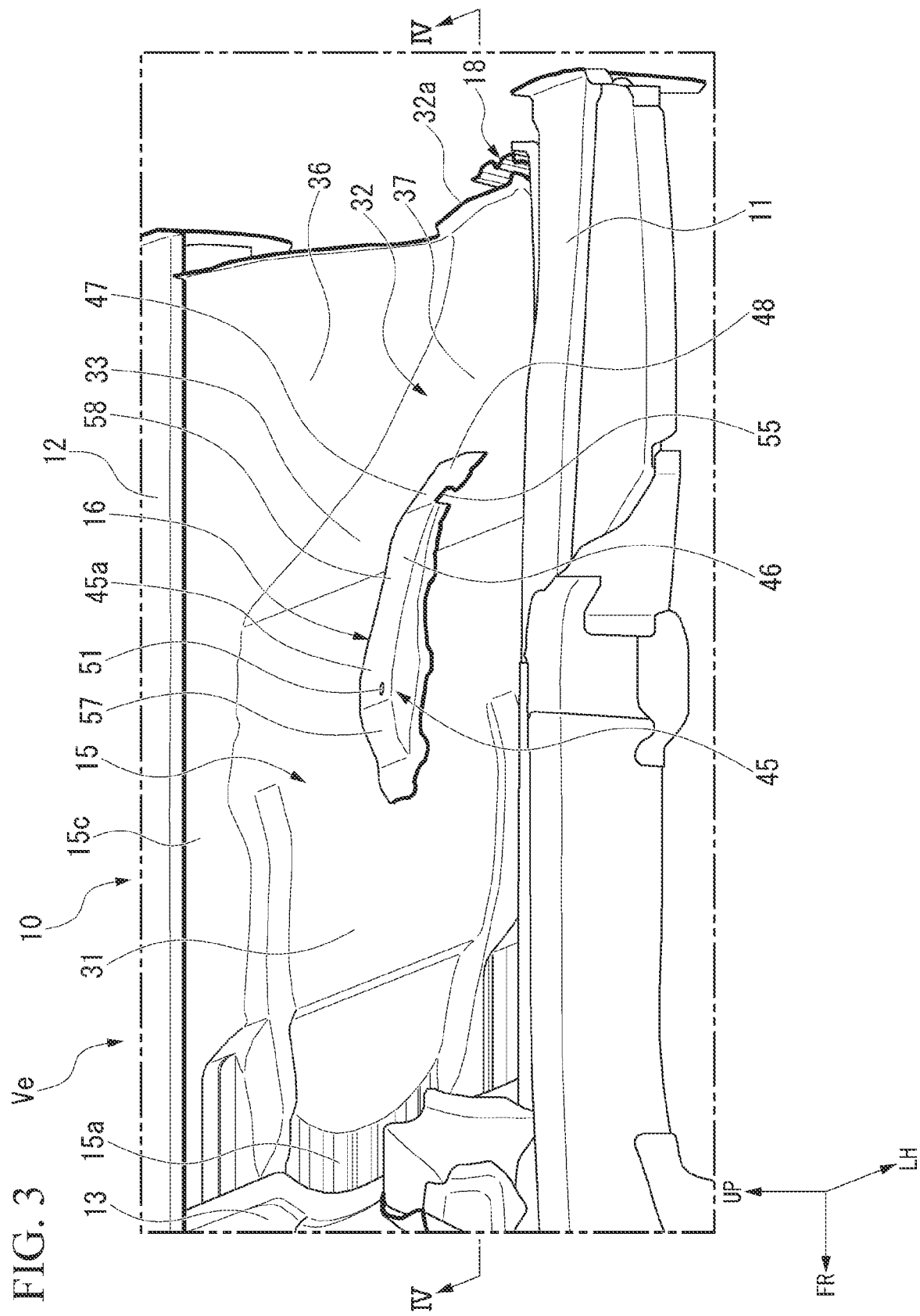
FIG. 3 is a perspective view of the vehicle rear structure according to the embodiment of the present invention from a left upper side.
Figure 4:
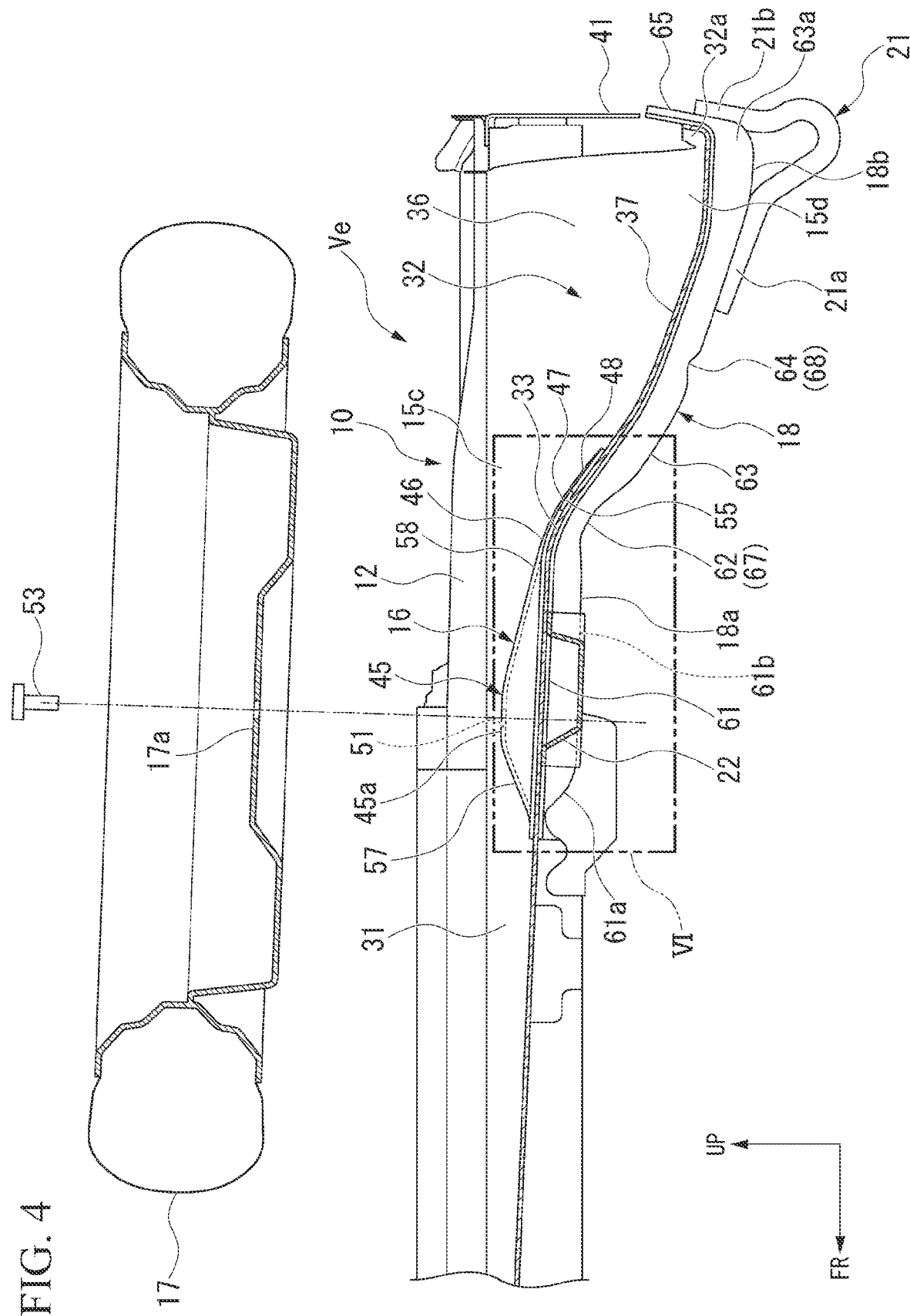
FIG. 4 is a cross-sectional view along line IV-IV of FIG. 3.

FIG. 3 is a perspective view showing the vehicle rear structure 10 according to the embodiment from a left upper side. FIG. 4 is a cross-sectional view along line IV-IV of FIG. 3.

As shown in FIG. 3 and FIG. 4, the rear floor pan 15 provided behind the rear floor cross member 13 of the vehicle body has a front end portion 15a connected to the rear floor cross member 13. The rear floor pan 15 has a left side portion 15b (see FIG. 5) connected to the left rear side frame 11. The rear floor pan 15 has a right side portion 15c connected to the right rear side frame 12.

That is, the rear floor pan 15 is provided between the left rear side frame 11 and the right rear side frame 12 in the vehicle width direction.

The rear floor pan 15 has a floor pan front half portion 31, a floor pan rear half portion 32 disposed behind the floor pan front half portion 31 of the vehicle body, and a floor pan ridge portion (ridge portion) 33 formed in a connecting portion between the floor pan front half portion 31 and the floor pan rear half portion 32.

The floor pan front half portion 31 has a front end portion (i.e., the front end portion 15a of the rear floor pan 15) connected to the rear floor cross member 13. The floor pan front half portion 31 has a left side portion and a right side portion that are connected to a front half portion of the left rear side frame 11 and a front half portion of the right rear side frame 12. The floor pan front half portion 31 extends gently downward, for example, from the front end portion 15a of the rear floor pan 15 toward the rear of the vehicle.

The spare tire 17 is disposed on the floor pan front half portion 31 from above. Accordingly, the spare tire 17 is disposed gently downward on the rear floor pan 15 (specifically, the floor pan front half portion 31) toward the rear of the vehicle (see also FIG. 2).

The floor pan rear half portion 32 has a left side portion 35 (see FIG. 5) and a right side portion 36 disposed on both left and rights, and a central portion 37 connected to the left side portion 35 and the right side portion 36.

The left side portion 35 hangs downward from the left rear side frame 11. The right side portion 36 hangs downward from the right rear side frame 12. The central portion 37 is connected to a lower side of the left side portion 35 and a lower side of the right side portion 36. The central portion 37 extends downward more abruptly compared to the floor pan front half portion 31 as it goes toward the rear of the vehicle from the rear end portion of the floor pan front half portion 31. Specifically describing, the central portion 37 extends downward in a gently curved shape to protrude downward.

For this reason, the floor pan ridge portion 33 is formed in an area where the front end portion of the central portion 37 and a rear end portion of the floor pan front half portion 31 cross each other. The floor pan ridge portion 33 protrudes upward in an inverted V shape, and extends in the vehicle width direction.

In addition, the floor pan rear half portion 32 has a rear end portion 32a formed by the left side portion 35, the right side portion 36 and the central portion 37 in a U shape when seen in a rear view from behind the vehicle.

A rear panel 41 is provided on the rear end portion 32a of the floor pan rear half portion 32, the rear end portion of the left rear side frame 11, and the rear end portion of the right rear side frame 12. A rear bumper beam 43 (see FIG. 1) is provided on the rear panel 41 from behind the vehicle.

As shown in FIG. 1, the rear bumper beam 43 is provided in the vehicle width direction. The rear bumper beam 43 has a left end portion 43a connected to a rear end portion of the left rear side frame 11, and a right end portion 43b connected to a rear end portion of the right rear side frame 12. That is, the rear bumper beam 43 bridges between the rear end portion of the left rear side frame 11 and the rear end portion of the right rear side frame 12.

<Spare Tire Bracket, Spare Tire>

Returning to FIG. 3 and FIG. 4, the spare tire bracket 16 is provided on the upper surface of the rear floor pan 15 from above. The spare tire bracket 16 is disposed on the rear floor pan 15 at a center in the vehicle width direction. The spare tire bracket 16 extends from the floor pan front half portion 31 to the middle of the floor pan rear half portion 32 via the floor pan ridge portion 33. The spare tire bracket 16 has a connecting portion (flange) of an outer circumference connected to the upper surface of the spare tire bracket 16.

The spare tire bracket 16 has a raised portion 45, a first rearward extension portion 46, a first easy bending section 47 and a second rearward extension portion 48 from the front of the vehicle toward the rear of the vehicle. The raised portion 45 has an apex portion 45a provided in an area of the floor pan front half portion 31 close to the floor pan ridge portion 33 and formed in a trapezoidal shape when seen in a side view.

For example, like the floor pan front half portion 31, the apex portion 45a is formed downward gently toward the rear of the vehicle. The raised portion 45 has a cross section in the vehicle width direction, which is formed in a hat shape.

A spare tire fixing portion 51 is provided on the apex portion 45a. The spare tire fixing portion 51 is formed such that a fixing tool 53 can be attached thereto. When the fixing tool 53 is fixed to the spare tire fixing portion 51, a center portion 17a of the spare tire 17 is fixed to the raised portion 45 by the fixing tool 53 (see also FIG. 1).

In this state, the spare tire 17 is disposed downward gently on the rear floor pan (specifically, the floor pan front half portion 31) toward the rear of the vehicle.

The first rearward extension portion 46 is formed integrally with the rear end of the raised portion 45 and provided on the floor pan front half portion 31. The first rearward extension portion 46 extends from the rear end of the raised portion 45 to the floor pan ridge portion 33.

The second rearward extension portion 48 is formed integrally with the rear end of the first rearward extension portion 46 and provided on the floor pan rear half portion 32. The second rearward extension portion 48 extends downward more abruptly than the first rearward extension portion 46 as it goes toward the rear of the vehicle from the rear end of the first rearward extension portion 46 along the floor pan rear half portion 32.

For this reason, the first easy bending section 47 is formed in an area where a front end of the second rearward extension portion 48 and a rear end of the first rearward extension portion 46 cross each other. The first easy bending section 47 protrudes upward along the upper surface of the floor pan ridge portion 33 in an inverted V shape. The first easy bending section 47 is provided on the floor pan ridge portion 33. In addition, the first easy bending section 47 is provided behind the spare tire fixing portion 51 in the vehicle.

The first easy bending section 47 is, for example, a fragile section formed by a pair of notches 55 (only the notch 55 on the left side is shown) provided on both side portions. The first easy bending section 47 may be a fragile section formed by, for example, a folded portion, a recessed portion, a hole portion, a thin portion, or the like, in addition to the notch 55. In this way, when the first easy bending section 47 is formed as the fragile section, the first easy bending section 47 can be formed by the notch 55, the folded portion, the recessed portion, the hole portion, the thin portion, or the like, in a simpler shape at a low cost.

Here, an area of the spare tire bracket 16 in front of the spare tire fixing portion 51 in the vehicle may be referred to as a bracket front section 57, and an area behind the spare tire fixing portion 51 in the vehicle may be referred to as a bracket rear section 58. The bracket front section 57 is formed by a front half portion of the raised portion 45. The bracket rear section 58 is formed by the rear half portion of the raised portion 45, the first rearward extension portion 46, the first easy bending section 47, and the second rearward extension portion 48. The bracket rear section 58 is formed longer toward the rear in the vehicle than the bracket front section 57.

That is, the spare tire bracket 16 is formed longer on the rear side in the vehicle than the front side in the vehicle with respect to the spare tire fixing portion 51.

<Reinforcement Member>

Figure 5:
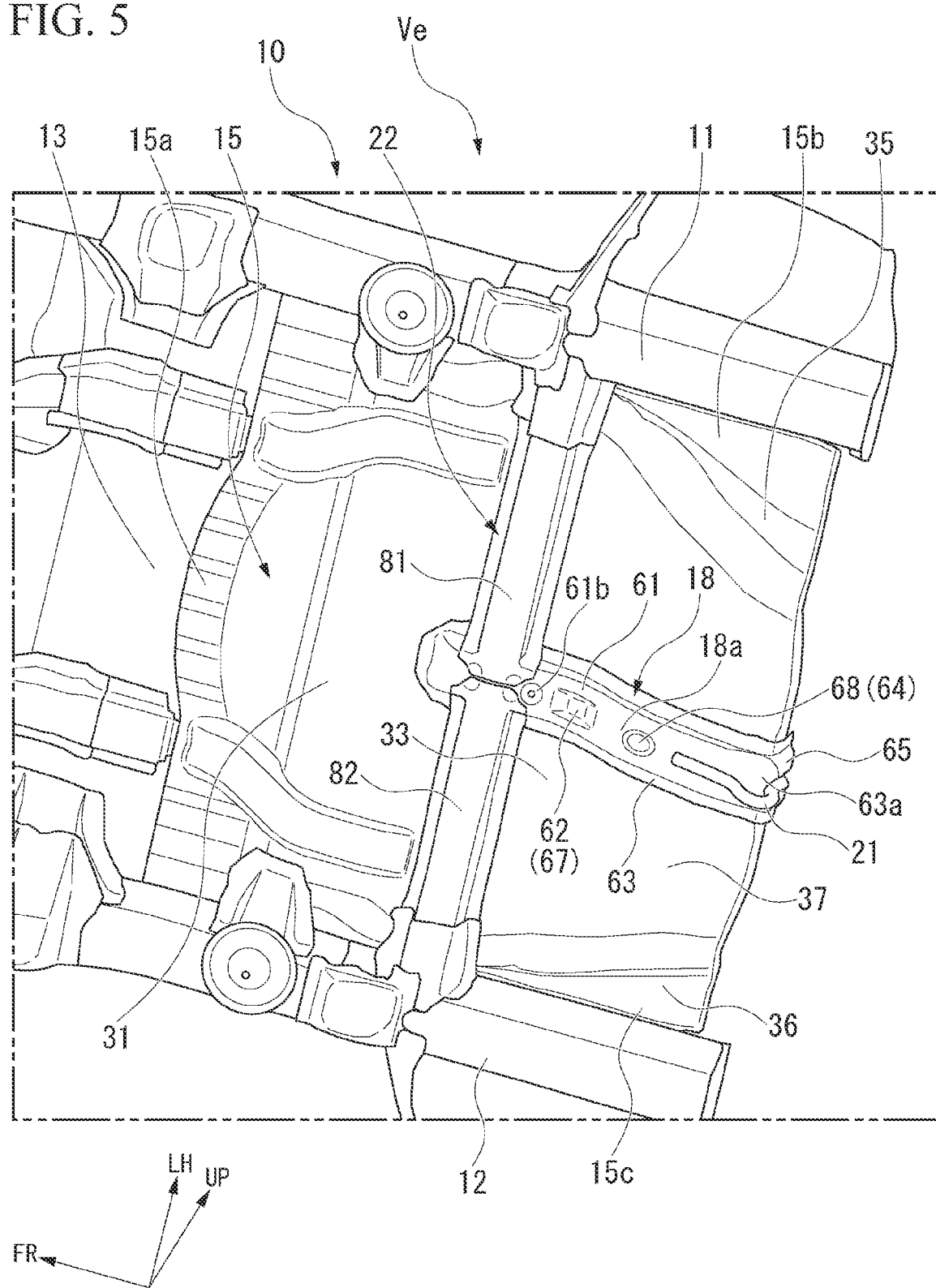
FIG. 5 is a perspective view showing the vehicle rear structure according to the embodiment of the present invention from a left lower side.

FIG. 5 is a perspective view showing the vehicle rear structure 10 according to the embodiment from a left lower side.

As shown in FIG. 4 and FIG. 5, the reinforcement member 18 is provided on the lower surface of the rear floor pan 15 from below. The reinforcement member 18 is disposed at a center of the rear floor pan 15 in the vehicle width direction. In addition, the reinforcement member 18 extends from the middle of the floor pan front half portion 31 in the forward/rearward direction to the rear end portion 32a of the floor pan rear half portion 32 via the floor pan ridge portion 33.

The reinforcement member 18 has a connecting portion (flange) of an outer circumference connected to the lower surface of the spare tire bracket 16. The reinforcement member 18 has a cross section in the vehicle width direction that is formed in a hat shape.

The reinforcement member 18 has a first inclination reinforcing portion 61, a second inclination reinforcing portion (inclined portion) 63 disposed at a rear end of the first inclination reinforcing portion 61, a second easy bending section 62 formed in an area where a front end of the second inclination reinforcing portion 63 and a rear end of the first inclination reinforcing portion 61 cross each other, a third easy bending section 64 provided on the second inclination reinforcing portion 63, and a vertical reinforcing portion 65 provided on a rear end portion 63a of the second inclination reinforcing portion 63.

The first inclination reinforcing portion 61 is provided on a lower surface of an area of the floor pan front half portion 31 close to the floor pan ridge portion 33 from below. The first inclination reinforcing portion 61 extends downward gently toward the rear of the vehicle along the raised portion 45 and the first rearward extension portion 46 of the spare tire bracket 16.

The second inclination reinforcing portion 63 is formed integrally with the rear end of the first inclination reinforcing portion 61 and is provided on the lower surface of the floor pan rear half portion 32 from below. The second inclination reinforcing portion 63 extends downward more abruptly compared to the first inclination reinforcing portion 61 as it goes toward the rear of the vehicle from the rear end of the first inclination reinforcing portion 61 to the rear end portion 32a of the floor pan rear half portion 32.

That is, the second inclination reinforcing portion 63 extends upward from the rear end portion 32a of the floor pan rear half portion 32 toward the front of the vehicle.

Specifically describing, the second inclination reinforcing portion 63 extends upward from the rear end portion 32*a* of the floor pan rear half portion 32 toward the front of the vehicle in a gently curved shape protruding downward.

The second easy bending section 62 is formed in an inverted V shape protruding upward along the lower surface of the floor pan ridge portion 33. The second easy bending section 62 is provided on the floor pan ridge portion 33, like the first easy bending section 47. In addition, the second easy bending section 62 is provided behind the spare tire fixing portion 51 of the vehicle, like the first easy bending section 47.

The second easy bending section 62 is, for example, a fragile section formed by a recessed portion 67 provided on a bottom portion 18*a* of the reinforcement member 18 with a hat-shaped cross section. The second easy bending section 62 may have, for example, a fragile section formed by a folded portion, a notch, a hole portion, a thin portion, or the like, in addition to the recessed portion 67. In this way, when the second easy bending section 62 is formed as the fragile section, the second easy bending section 62 can be formed by the recessed portion 67, the folded portion, the notch, the hole portion, the thin portion, or the like, in a simpler shape at a low cost.

Figure 6:
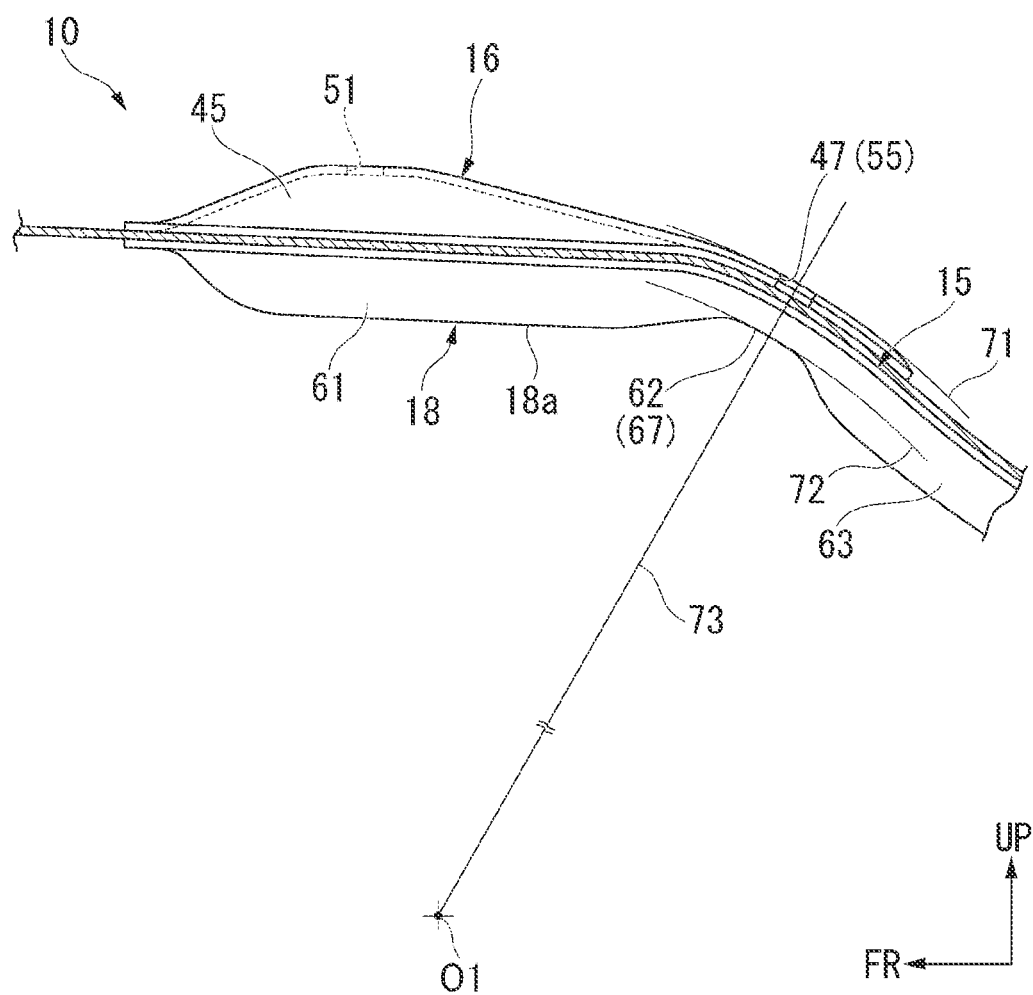
FIG. 6 is an enlarged cross-sectional view of a portion VI of FIG. 4.

FIG. 6 is an enlarged cross-sectional view of a portion VI of FIG. 4.

As shown in FIG. 4 and FIG. 6, the second easy bending section 62 is disposed below the first easy bending section 47 formed on the spare tire bracket 16. Specifically, the first easy bending section 47 and the second easy bending section 62 are provided at the same position in the vehicle forward/rearward direction.

In addition, the first easy bending section 47 is disposed on a first arc (arc) 71. The second easy bending section 62 is disposed on a second arc (arc) 72. The first arc 71 and the second arc 72 are arcs with the same center O1. The first easy bending section 47 and the second easy bending section 62 are disposed on the same normal line 73 on the first arc 71 and the second arc 72.

That is, the first easy bending section 47 and the second easy bending section 62 are disposed on the first arc 71 and the second arc 72 with the same center O1, and disposed on the same normal line 73.

The third easy bending section 64 is provided at, for example, a center of the second inclination reinforcing portion 63 in the vehicle forward/rearward direction. The third easy bending section 64 is provided behind the second easy bending section 62 in the vehicle. The third easy bending section 64 is, for example, a fragile section formed by a recessed portion 68 provided on the bottom portion 18*a* with a hat-shaped cross section, like the second easy bending section 62.

The third easy bending section 64 may have, for example, a fragile section formed by a folded portion, a notch, a hole portion, a thin portion, or the like, in addition to the recessed portion 68. In this way, when the third easy bending section 64 is formed as the fragile section, the third easy bending section 64 can be formed by the recessed portion 68, the folded portion, the notch, the hole portion, the thin portion, or the like, in a simpler shape at a low cost.

The vertical reinforcing portion 65 stands upward from the rear end portion 63*a* of the second inclination reinforcing portion 63. The vertical reinforcing portion 65 is connected to a rear surface of the rear panel 41 from the rear of the vehicle.

<Towing Hook>

The towing hook 21 is provided on a rear section 18*b* of the reinforcement member 18. The towing hook 21 is formed in substantially a U shape when seen in a side view. The towing hook 21 has a front end portion 21*a* in the second inclination reinforcing portion 63 connected to an area adjacent to the rear end portion 63*a* of the second inclination reinforcing portion 63 and behind the third easy bending section 64 in the vehicle from below. In addition, the towing hook 21 has a rear end portion 21*b* connected to the vertical reinforcing portion 65 from the rear of the vehicle. For this reason, the towing hook 21 is provided on the rear section of the reinforcement member 18, and provided on a rear section 15*d* of the rear floor pan 15 via the rear section 18*b* of the reinforcement member 18.

When the towing hook 21 is provided on the rear section 18*b* of the reinforcement member 18, the rear section 18*b* of the reinforcement member 18 is reinforced by the towing hook 21, and rigidity of the rear section 18*b* of the reinforcement member 18 is further increased.

That is, the second inclination reinforcing portion 63 has the third easy bending section 64 that extends upward from the towing hook 21 as it goes toward the front of the vehicle and that is provided in front of the towing hook 21 in the vehicle.

The towing hook 21 is used by, for example, applying a rope to the towing hook 21 when the vehicle is towed. In addition, the towing hook 21 is used as a jackup point that connects a jack when the vehicle is jacked up.

<Floor Pan Cross Member>

As shown in FIG. 4 and FIG. 5, in the floor pan front half portion 31 of the rear floor pan 15, the floor pan cross member 22 is provided on the lower surface. The floor pan cross member 22 is disposed in the floor pan front half portion 31 close to the floor pan ridge portion 33. The floor pan cross member 22 bridges between the left rear side frame 11 and the right rear side frame 12 and extends in the vehicle width direction. The floor pan cross member 22 is divided into, for example, a left cross member 81 and a right cross member 82.

The left cross member 81 extends leftward in the vehicle width direction along the lower surface of the floor pan front half portion 31 from a connecting area 61*b* of the first inclination reinforcing portion 61 close to a front end portion 61*a* to the left rear side frame 11. The connecting area 61*b* of the first inclination reinforcing portion 61 is located in front of the second inclination reinforcing portion 63 (specifically, the second easy bending section 62) of the vehicle. The left cross member 81 is a high rigidity member formed in a closed cross-sectional hollow shape together with the floor pan front half portion 31.

The right cross member 82 extends rightward in the vehicle width direction along the lower surface of the floor pan front half portion 31 from the connecting area 61*b* of the first inclination reinforcing portion 61 to the right rear side frame 12. The right cross member 82 is a high rigidity member formed in a closed cross-sectional hollow shape together with the floor pan front half portion 31.

That is, in the reinforcement member 18, the connecting area 61*b* of the first inclination reinforcing portion 61 is connected to the floor pan cross member 22.

Further, while the example in which the floor pan cross member 22 is connected to the connecting area 61*b* of the first inclination reinforcing portion 61 close to the front end portion 61*a* has been described in the embodiment, there is no limitation thereto. In another example, for example, the floor pan cross member 22 may be connected to the front end portion 61a of the first inclination reinforcing portion 61. Accordingly, the front end portion 61a of the first inclination reinforcing portion 61 can be prevented from protruding from the floor pan cross member 22 to the front of the vehicle.

Next, for example, when an impact load is input to the vehicle rear structure 10 from the rear of the vehicle body due to a rear end collision, an example in which the spare tire 17 is appropriately controlled to protect the rear seat 14 from the spare tire 17 will be described with reference to FIG. 4 to FIG. 8.

First, an example in which the trailer hitch TH (see FIG. 10) is not attached to the rear end portion of the vehicle Ve will be described with reference to FIG. 7.

Figure 7:
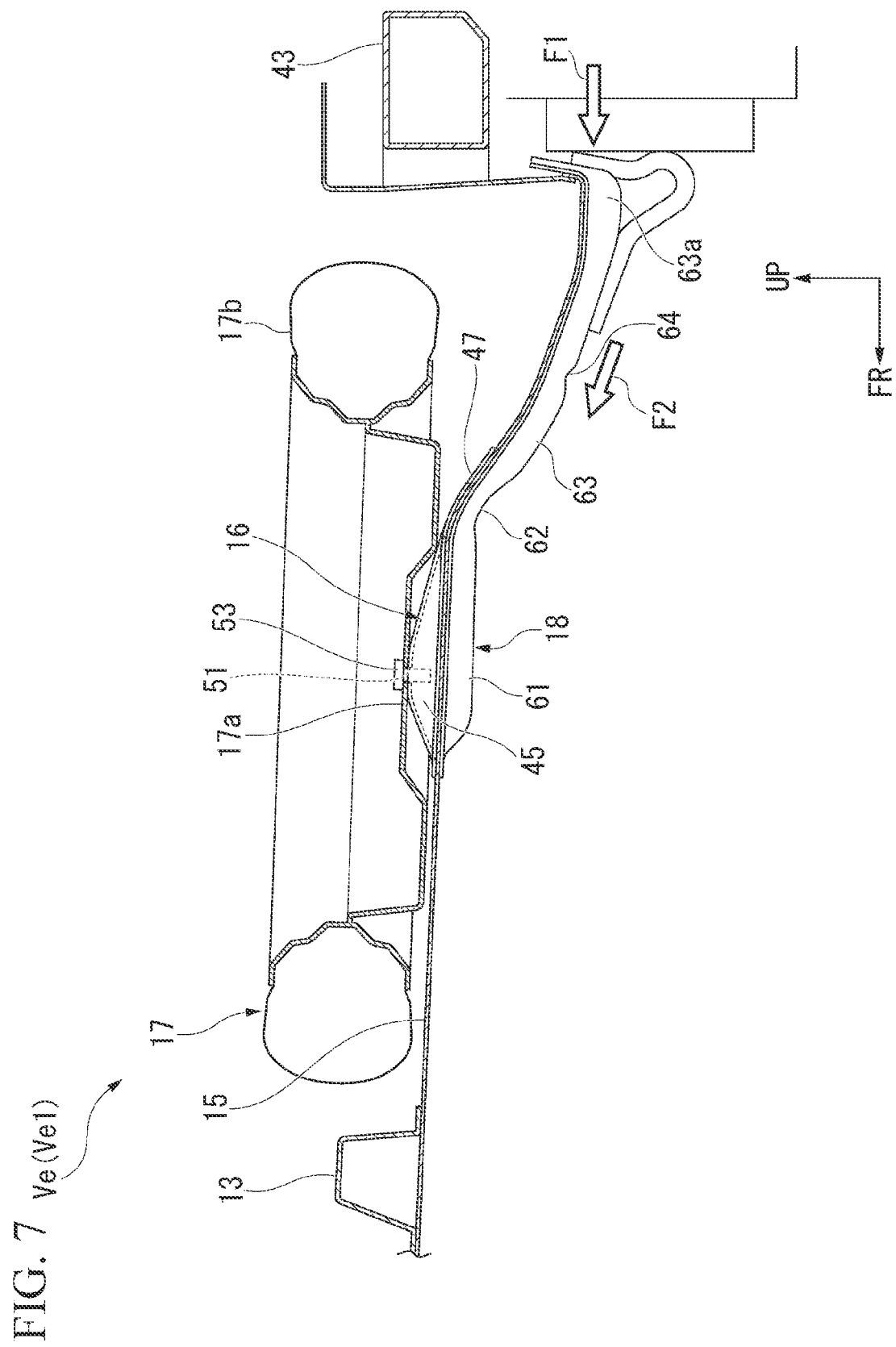
FIG. 7 is a cross-sectional view for describing an example in which an impact load is input to a reinforcement member of the vehicle rear structure according to the embodiment of the present invention due to a rear end collision.
Figure 8:
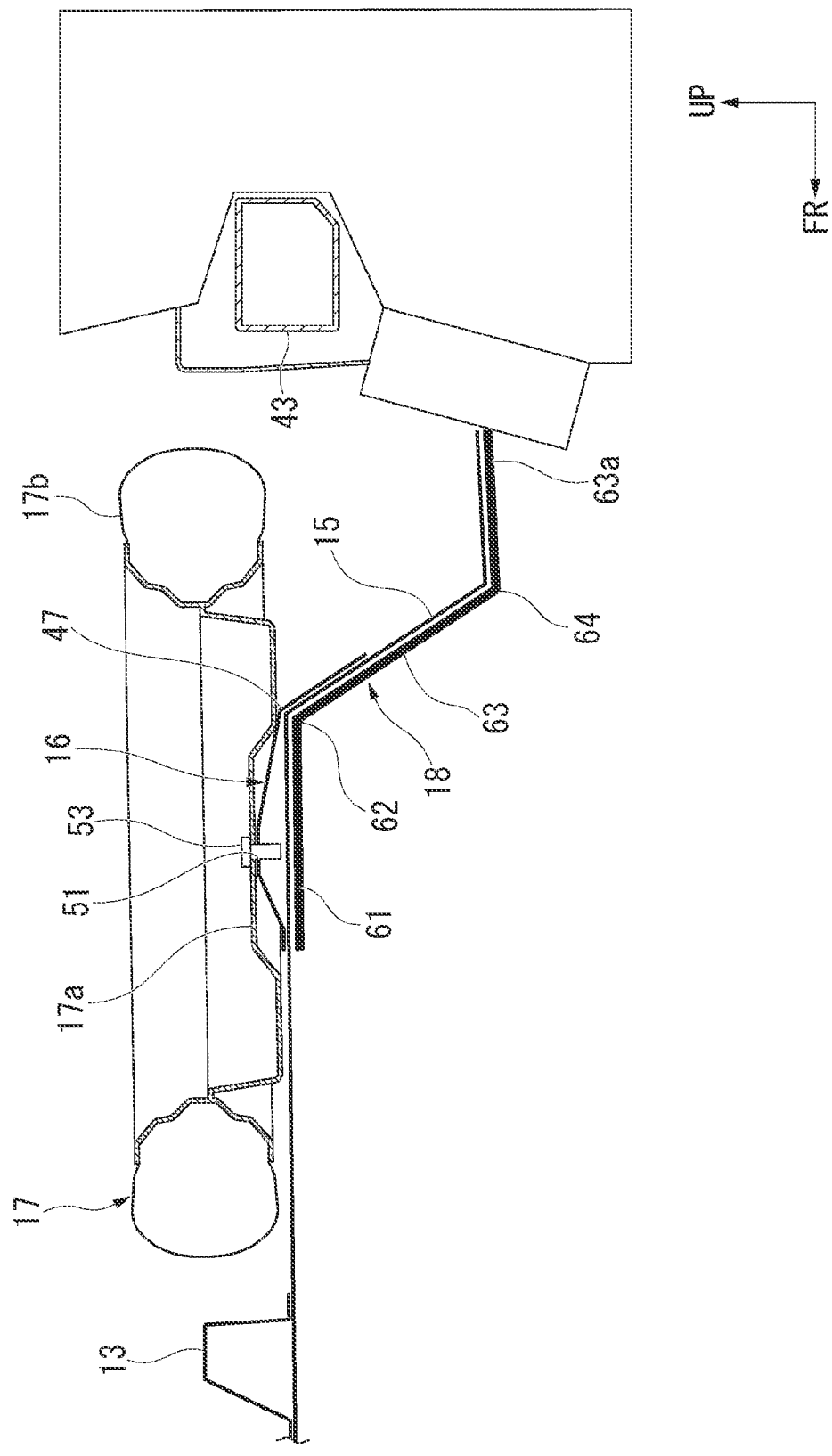
FIG. 8 is a cross-sectional view for describing an example in which the reinforcement member is folded in a Z shape by a load input to the reinforcement member according to the embodiment of the present invention.
Figure 9:
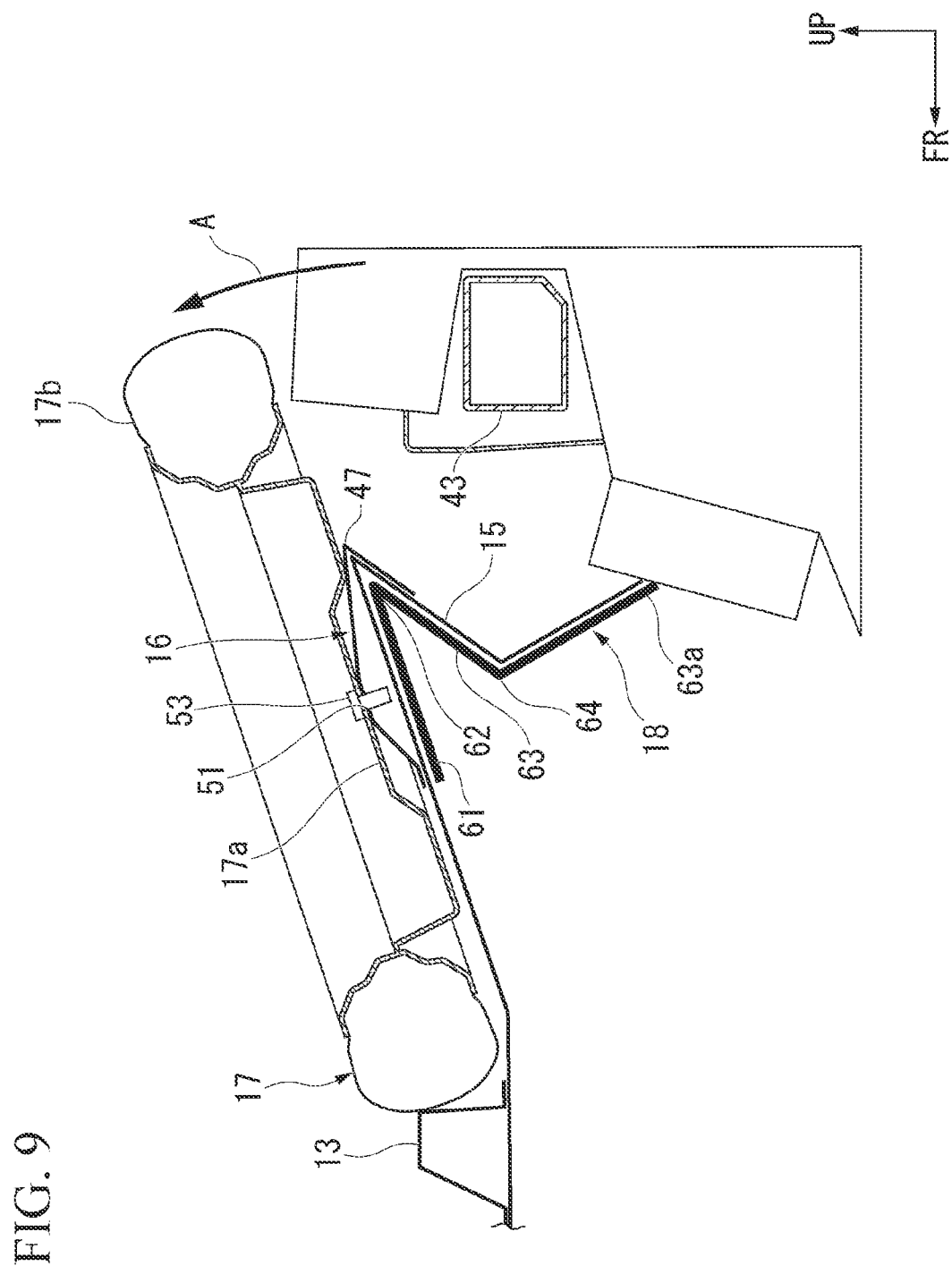
FIG. 9 is a cross-sectional view for describing an example in which a rear section of a spare tire is flipped up by a load input to the reinforcement member according to the embodiment of the present invention.

FIG. 7 is a cross-sectional view for describing an example in which an impact load is input to the reinforcement member 18 of the vehicle rear structure 10 due to a rear end collision. FIG. 8 is a cross-sectional view for describing an example in which the reinforcement member 18 is folded in a Z shape due to a load input to the reinforcement member 18. FIG. 9 is a cross-sectional view for describing an example in which a rear section 17b of the spare tire 17 is flipped up due to a load input to the reinforcement member 18.

As shown in FIG. 7, the vehicle Ve does not have the trailer hitch TH (see FIG. 10) attached to the rear end portion. Hereinafter, the vehicle Ve with no trailer hitch TH may be referred to as "a vehicle Ve1."

According to the vehicle Ve1, for example, upon a rear end collision, an impact load F1 is horizontally input to the rear end portion 63a of the second inclination reinforcing portion 63 toward the front of the vehicle.

For this reason, a compression load F2 input upward to the rear end portion 63a of the second inclination reinforcing portion 63 toward the front of the vehicle is smaller than the impact load F1. Accordingly, it is conceivable that the second easy bending section 62 of the reinforcement member 18 cannot be easily bent by the compression load F2. Here, the third easy bending section 64 is provided behind the second easy bending section 62 of the reinforcement member 18 in the vehicle. Hereinafter, the compression load F2 may be simply referred to as "the load F2."

As shown in FIG. 8, even when the load F2 (see FIG. 7) in the upward direction input to the rear end portion 63a of the second inclination reinforcing portion 63 is small, the second easy bending section 62 can be bent upward by bending the third easy bending section 64 downward. Accordingly, the reinforcement member 18 can be folded in a Z shape by being bent at two places of the second easy bending section 62 and the third easy bending section 64.

In addition, the reinforcement member 18 is folded in a Z shape by the load F2, the first easy bending section 47 of the spare tire bracket 16 can be bent upward together with the second easy bending section 62.

Here, the first easy bending section 47 and the second easy bending section 62 are provided at behind the spare tire fixing portion 51 in the vehicle. In addition, in the spare tire bracket 16, the bracket rear section 58 is formed longer than the bracket front section 57 (both, see FIG. 3).

For this reason, when the first easy bending section 47 and the second easy bending section 62 are bent upward by the upward load F2 (see FIG. 7) input to the second inclination reinforcing portion 63, it is possible to prevent the spare tire fixing portion 51 from being separated from the rear floor pan 15. Accordingly, the rear side of the spare tire fixing portion 51 in the vehicle can be flipped up while being directed upward together with the rear floor pan 15.

As shown in FIG. 9, in a state in which the spare tire 17 is fixed to the spare tire fixing portion 51, the spare tire 17 is not separated from the rear floor pan 15, and the rear section 17b of the spare tire 17 can be flipped upward. Accordingly, a behavior (movement) of the spare tire 17 can be appropriately controlled so as to pivot the spare tire 17 toward the front of the vehicle as shown by an arrow A, and for example, it is possible to prevent the spare tire 17 from coming into contact with the rear seat 14 (see FIG. 2). For this reason, it is possible to improve safety of the vehicle Ve.

Here, the reinforcement member 18 can be folded in a Z shape by being bent at two places of the second easy bending section 62 and the third easy bending section 64 due to the load F2 (see FIG. 7) input to the reinforcement member 18. In addition, the spare tire bracket 16 can be bent at the first easy bending section 47 while the reinforcement member 18 is folded in a Z shape. Accordingly, the load F2 input to the reinforcement member 18 can be absorbed by the reinforcement member 18, the spare tire bracket 16, or the like.

In addition, as shown in FIG. 6 and FIG. 7, the first easy bending section 47 and the second easy bending section 62 are provided at the same position in the vehicle forward/rearward direction. For this reason, when the load F2 is input to the rear end portion 63a of the second inclination reinforcing portion 63, in the spare tire bracket 16 and the reinforcement member 18, stress is concentrated on the same position (i.e., the first easy bending section 47 and the second easy bending section 62) in the vehicle forward/rearward direction.

Accordingly, the spare tire bracket 16 and the reinforcement member 18 can be reliably (appropriately) bent behind the spare tire fixing portion 51 of the vehicle together with the rear floor pan 15. Accordingly, the spare tire 17 is not separated from the rear floor pan 15, and the rear section 17b of the spare tire 17 can be reliably (appropriately) flipped upward (see also FIG. 9). For this reason, safety of the vehicle Ve can be reliably improved.

Further, the first easy bending section 47 and the second easy bending section 62 are disposed on the first arc 71 and the second arc 72 having the same center O1, and disposed on the same normal line 73. For this reason, when the load F2 is input to the rear end portion 63a of the second inclination reinforcing portion 63, stress can be concentrated on the first easy bending section 47 and the second easy bending section 62 on the same normal line 73 in the spare tire bracket 16 and the reinforcement member 18.

Accordingly, the spare tire bracket 16 and the reinforcement member 18 can be reliably (appropriately) bent together with the rear floor pan 15 at behind the spare tire fixing portion 51 in the vehicle. Accordingly, it is possible to reliably (appropriately) flip the rear section 17b of the spare tire 17 upward without separating the spare tire 17 from the rear floor pan 15.

In addition, as shown in FIG. 4 and FIG. 7, the first easy bending section 47 and the second easy bending section 62 are provided on the floor pan ridge portion 33. For this reason, when the reinforcement member 18 is bent at the second easy bending section 62 while the spare tire bracket 16 is bent at the first easy bending section 47 by the load F2, the rear floor pan 15 can be bent at the floor pan ridge portion 33 provided behind the spare tire fixing portion 51 in the vehicle.

Accordingly, the spare tire fixing portion 51 can be suppressed from being separated from the rear floor pan 15, and the rear side of the spare tire fixing portion 51 in the vehicle can be flipped upward more reliably together with the rear floor pan 15. Accordingly, in a state in which the spare tire 17 is fixed to the spare tire fixing portion 51, it is possible to flip the rear section 17b of the spare tire 17 upward without separating the spare tire 17 from the rear floor pan 15.

Further, as shown in FIG. 5 and FIG. 7, in the reinforcement member 18, the connecting area 61b of the first inclination reinforcing portion 61 which is in front with respect to the second easy bending section 62 in the vehicle is connected to the floor pan cross member 22. For this reason, the connecting area 61b of the first inclination reinforcing portion 61 is reinforced by the floor pan cross member 22. Accordingly, a reaction force that supports the load F2 input to the rear end portion 63a of the second inclination reinforcing portion 63 can be appropriately secured by the reinforcement member 18, and the reinforcement member 18 can be braced between the towing hook 21 (i.e., the rear end portion 63a of the second inclination reinforcing portion 63) and the floor pan cross member 22.

In this state, when the load F2 exceeds the reaction force, the spare tire bracket 16 can be reliably bent at the first easy bending section 47, and the reinforcement member 18 can be reliably bent at the second easy bending section 62 and the third easy bending section 64. In addition, the rear floor pan 15 can be reliably bent at the floor pan ridge portion 33. Accordingly, it is possible to flip the rear section 17b of the spare tire 17 upward reliably without separating the spare tire 17 from the rear floor pan 15.

Next, an example in which the trailer hitch TH (see FIG. 10) is attached to the rear end portion of the vehicle Ve will be described with reference to FIG. 8.

Figure 10:
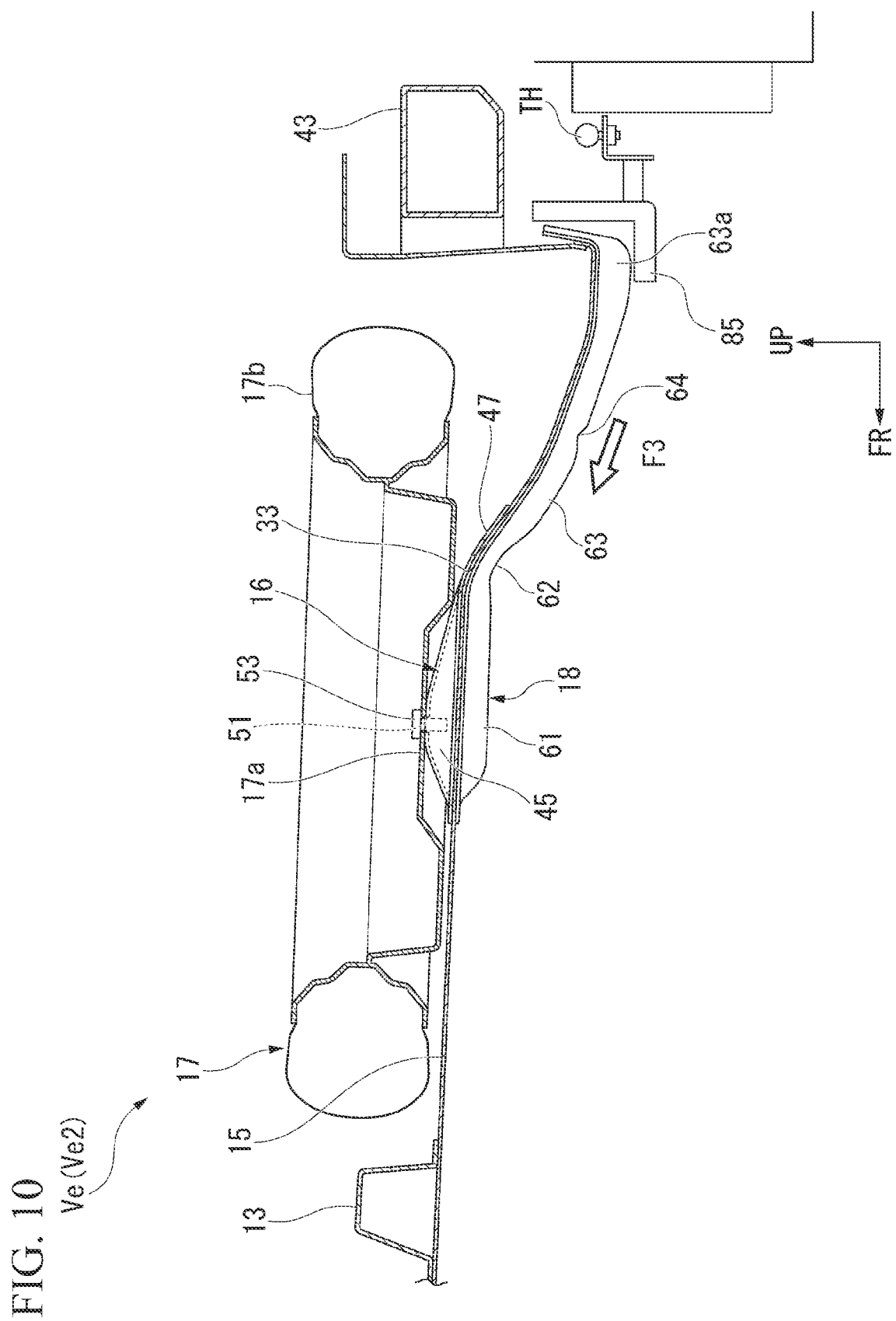
FIG. 10 is a cross-sectional view for describing an example in which an impact load is input to a trailer hitch of the vehicle rear structure according to the embodiment of the present invention due to a rear end collision.
Figure 11:
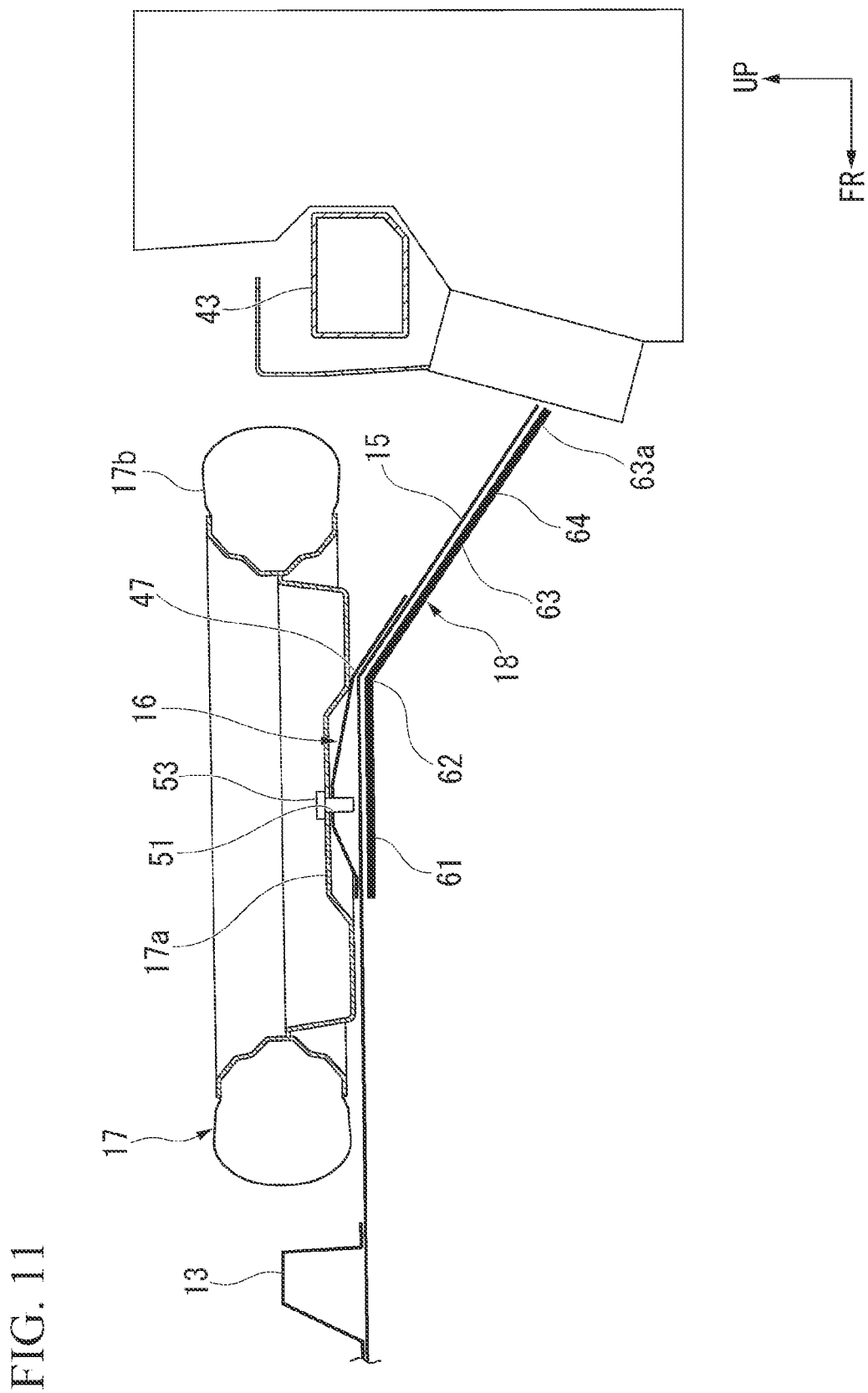
FIG. 11 is a cross-sectional view for describing an example in which the reinforcement member is folded in a V shape by a load input to the trailer hitch according to the embodiment of the present invention.
Figure 12:
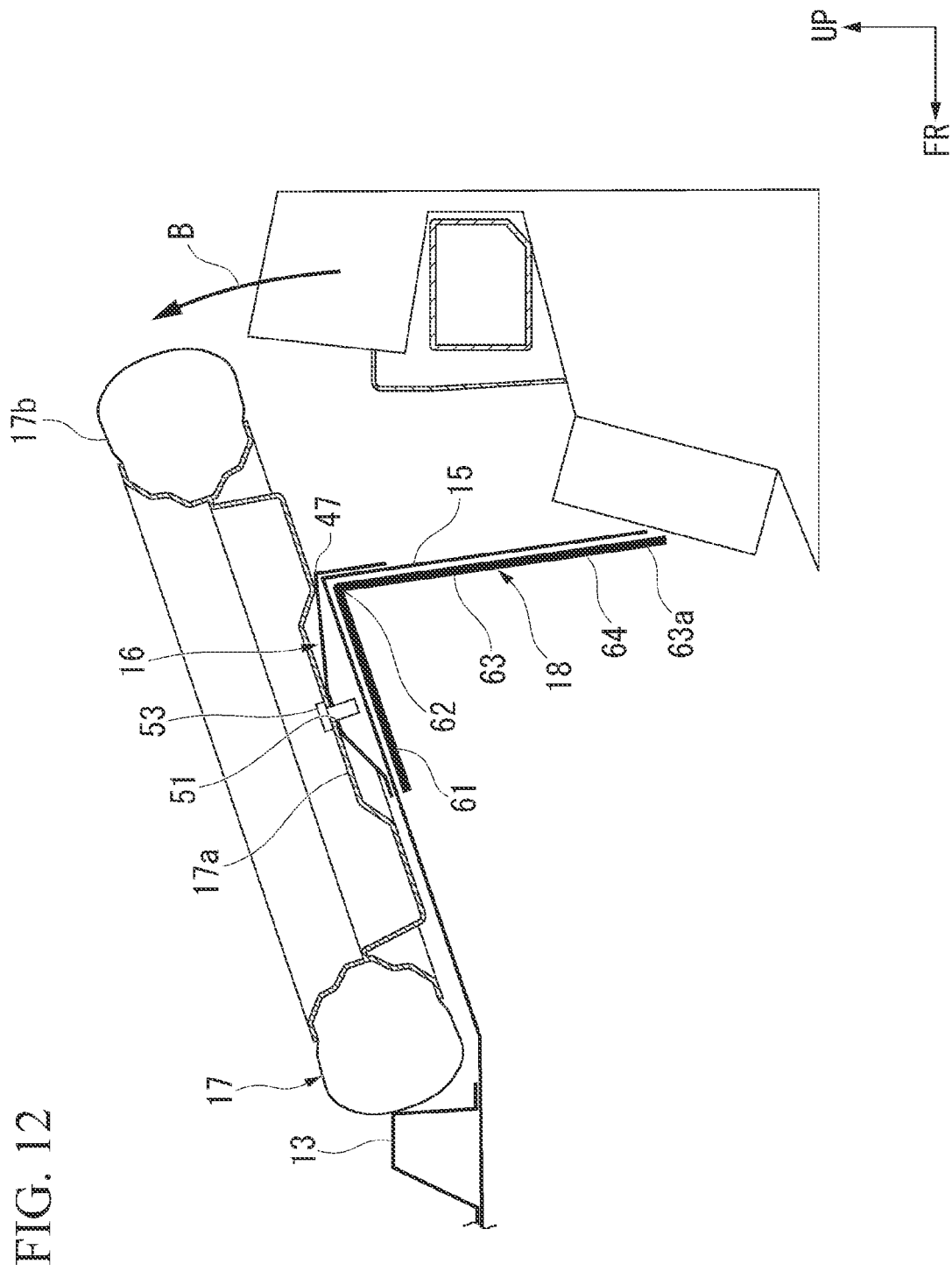
FIG. 12 is a cross-sectional view for describing an example in which the rear section of the spare tire is flipped up by a load input to the trailer hitch according to the embodiment of the present invention.

FIG. 10 is a cross-sectional view for describing an example in which an impact load is input to the trailer hitch TH of the vehicle rear structure 10 due to a rear end collision. FIG. 11 is a cross-sectional view for describing an example in which the reinforcement member 18 is folded in a Z shape by the load input to the trailer hitch TH. FIG. 12 is a cross-sectional view for describing an example in which the rear section 17b of the spare tire 17 is flipped upward by the load input to the trailer hitch TH.

As shown in FIG. 10, the trailer hitch TH is attached to the rear end portion of the vehicle Ve. Hereinafter, the vehicle Ve including the trailer hitch TH may be referred to as "a vehicle Ve2."

According to the vehicle Ve2, an impact load F3 is input to the rear end portion 63a of the second inclination reinforcing portion 63 during the rear end collision as an upward compression load toward the front of the vehicle via a trailer hitch attachment portion 85. Hereinafter, the impact load F3 may be simply abbreviated as "the load F3."

As shown in FIG. 11, the second easy bending section 62 can be bent upward by the load F3 (see FIG. 10) input to the rear end portion 63a of the second inclination reinforcing portion 63. Accordingly, the reinforcement member 18 can be bent at the second easy bending section 62 to be folded in a V shape.

In addition, when the reinforcement member 18 is folded in a V shape by the load F3, the first easy bending section 47 of the spare tire bracket 16 can be bent upward together with the second easy bending section 62.

Here, the first easy bending section 47 and the second easy bending section 62 are provided behind the spare tire fixing portion 51 of the vehicle. In addition, in the spare tire bracket 16, the bracket rear section 58 is formed longer than the bracket front section 57 (both, see FIG. 3).

For this reason, when the first easy bending section 47 and the second easy bending section 62 are bent upward by the upward load F3 (see FIG. 10) input to the second inclination reinforcing portion 63, the spare tire fixing portion 51 can be prevented from being separated from the rear floor pan 15. Accordingly, the rear side of the spare tire fixing portion 51 of the vehicle can be flipped upward together with the rear floor pan 15.

As shown in FIG. 12, in a state in which the spare tire 17 is fixed to the spare tire fixing portion 51, it is possible to flip the rear section 17b of the spare tire 17 upward without separating the spare tire 17 from the rear floor pan 15. Accordingly, a behavior (movement) of the spare tire 17 can be appropriately controlled such that the spare tire 17 pivots toward the front of the vehicle like an arrow B, and for example, the spare tire 17 can be prevented from coming in contact with the rear seat 14 (see FIG. 2).

The reinforcement member 18 can be bent and folded in a V shape at the second easy bending section 62 by the load F3 (see FIG. 10) input to the reinforcement member 18. In addition, the spare tire bracket 16 can be bent at the first easy bending section 47 while the reinforcement member 18 is folded in a V shape. Accordingly, the load F3 input to the reinforcement member 18 can be absorbed by the reinforcement member 18, the spare tire bracket 16, or the like.

In addition, according to the vehicle Ve2 including the trailer hitch TH, the same actions and effects as the vehicle Ve1 including no trailer hitch TH can be obtained.

[Variant]

Next, a vehicle rear structure 100 of a variant will be described with reference to FIG. 13. In the vehicle rear structure 100 of the variant, the same or similar components as the vehicle rear structure 10 of the embodiment are designated by the same reference signs and description thereof will be omitted.

Figure 13:
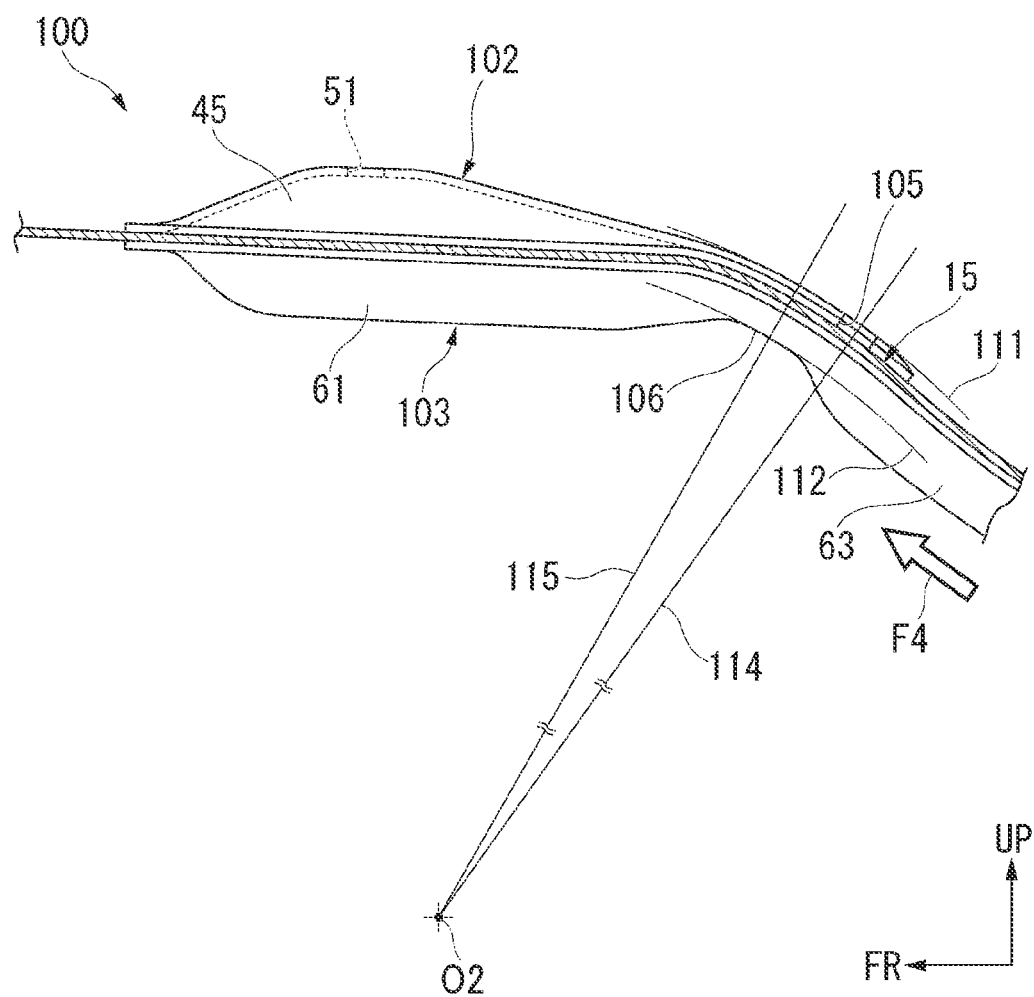
FIG. 13 is a cross-sectional view showing a vehicle rear structure of a variant.

FIG. 13 is a cross-sectional view showing the vehicle rear structure 100 of the variant.

As shown in FIG. 13, the vehicle rear structure 100 is obtained by replacing the spare tire bracket 16 and the reinforcement member 18 of the embodiment with a spare tire bracket 102 and a reinforcement member 103, and other configurations are the same as the vehicle rear structure 10 of the embodiment.

The spare tire bracket 102 is obtained by replacing the first easy bending section 47 of the embodiment with a first easy bending section 105, and other areas are the same as the spare tire bracket 16 of the embodiment. The first easy bending section 105 is, for example, a fragile section formed by a notch, a folded portion, a recessed portion, a hole portion, a thin portion, or the like, like the first easy bending section 47 of the first embodiment.

The reinforcement member 103 is obtained by replacing the second easy bending section 62 of the embodiment with a second easy bending section 106, and other areas are the same as the reinforcement member 18 of the embodiment. The second easy bending section 106 is, for example, a fragile section formed by a recessed portion, a folded portion, a notch, a hole portion, a thin portion, or the like, like the second easy bending section 62 of the first embodiment.

The first easy bending section 105 and the second easy bending section 106 are provided at positions deviated (offset) in the vehicle forward/rearward direction. For this reason, when an upward load F4 is input to the second inclination reinforcing portion 63 of the reinforcement member 103 toward the front of the vehicle, places where stress is concentrated on the spare tire bracket 102 and the reinforcement member 103 can be distributed in the vehicle forward/rearward direction. Accordingly, rigidity can be appropriately secured in whole of the spare tire bracket 102, the reinforcement member 103 and the rear floor pan 15. That is, a reaction force that supports the upward load F4 input to the second inclination reinforcing portion 63 of the reinforcement member 103 can be appropriately secured.

In this state, when the load F4 exceeds the reaction force, the spare tire bracket 102 can be bent at the first easy bending section 105, and the reinforcement member 103 can be bent at the second easy bending section 106. Accordingly, the load F4 input to the second inclination reinforcing portion 63 of the reinforcement member 103 can be absorbed by the spare tire bracket 102, the reinforcement member 103, and the rear floor pan 15.

Meanwhile, the spare tire bracket 102 is bent at the first easy bending section 105. Accordingly, the reinforcement member 103 can be bent at the second easy bending section 106. For this reason, the spare tire bracket 102 and the reinforcement member 103 can be reliably (appropriately) bent together with the rear floor pan 15 at behind the spare tire fixing portion 51 in the vehicle.

Accordingly, the spare tire 17 (see FIG. 2) is not separated from the rear floor pan 15, and the rear section 17b (see FIG. 2) of the spare tire 17 can be reliably (appropriately) flipped upward.

In addition, the first easy bending section 105 is disposed on a first arc (arc) 111. The second easy bending section 106 is disposed on a second arc (arc) 112. The first arc 111 and the second arc 112 are arcs having the same center O2. Here, the first easy bending section 105 is disposed on a first normal line (normal line) 114. The second easy bending section 106 is disposed on a second normal line (normal line) 115.

That is, the first easy bending section 105 and the second easy bending section 106 are disposed on the deviated (offset) normal line on the arcs having the same center O2.

For this reason, when the upward load F4 is input to the second inclination reinforcing portion 63 of the reinforcement member 103 toward the front of the vehicle, places to which stress is concentrated can be distributed in the spare tire bracket 102 and the reinforcement member 103 in the vehicle forward/rearward direction. Accordingly, rigidity can be appropriately secured in all of the spare tire bracket 102, the reinforcement member 103, and the rear floor pan 15. That is, a reaction force that supports the upward load F4 input to the second inclination reinforcing portion 63 of the reinforcement member 103 can be appropriately secured.

In this state, when the load F4 exceeds the reaction force, the spare tire bracket 102 is bent at the first easy bending section 105. Accordingly, the reinforcement member 103 can be bent at the second easy bending section 106. Accordingly, the load F4 input to the second inclination reinforcing portion 63 of the reinforcement member 103 can be absorbed by the spare tire bracket 102, the reinforcement member 103, and the rear floor pan 15.

Meanwhile, the spare tire bracket 102 can be bent at the first easy bending section 105, and the reinforcement member 103 can be bent at the second easy bending section 106. For this reason, the spare tire bracket 102 and the reinforcement member 103 can be reliably (appropriately) bent together with the rear floor pan 15 at behind the spare tire fixing portion 51 of the vehicle. Accordingly, the rear section 17b (see FIG. 2) of the spare tire 17 can be reliably (appropriately) flipped upward without separating the spare tire 17 (see FIG. 2) from the rear floor pan 15.

Further, the technical scope of the present invention is not limited to the embodiment, and various modifications may be made without departing from the scope of the present invention.

In addition, the components of the embodiment can be appropriately replaced with known components and the above-mentioned variants may be appropriately combined without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle rear structure comprising:
    a rear floor pan;
    a spare tire bracket that is provided on an upper surface of the rear floor pan and that has a longer rear section than a front section thereof in the vehicle with respect to a spare tire fixing portion;
    a spare tire fixed to the spare tire fixing portion;
    a reinforcement member having an inclined portion that is provided on a lower surface of the rear floor pan and that extends upward from a rear section of the rear floor pan towards the front of the vehicle; and
    a hook provided on a rear section of the reinforcement member,
    wherein the spare tire bracket has a first easy bending section provided behind the spare tire fixing portion in the vehicle, to which the spare tire is fixed, and
    the reinforcement member has a second easy bending section provided behind the spare tire fixing portion in the vehicle.

2. The vehicle rear structure according to claim 1, wherein the first easy bending section and the second easy bending section are fragile sections.

3. The vehicle rear structure according to claim 1, wherein the first easy bending section and the second easy bending section are provided at a same position in a vehicle forward/rearward direction.

4. The vehicle rear structure according to claim 3, wherein the first easy bending section and the second easy bending section are disposed on arcs having a same center and disposed on a same normal line.

5. The vehicle rear structure according to claim 1, wherein the first easy bending section and the second easy bending section are provided at positions deviated in the vehicle forward/rearward direction.

6. The vehicle rear structure according to claim 5, wherein the first easy bending section and the second easy bending section are disposed on arcs having the same center and disposed on deviated normal lines.

7. The vehicle rear structure according to claim 1, wherein the first easy bending section and the second easy bending section are provided on a ridge portion extending in the rear floor pan in a vehicle width direction.

8. The vehicle rear structure according to claim 1, comprising:
    a pair of rear side frames extending in a vehicle forward/rearward direction while being provided on an outer side of the rear floor pan in a vehicle width direction; and
    a rear cross member that extends in the vehicle width direction so as to bridge the pair of rear side frames and that is provided on a lower surface of the rear floor pan, wherein an area of the reinforcement member on the front side of the vehicle with respect to the inclined portion is connected to the rear cross member.

9. The vehicle rear structure according to claim 1, wherein the reinforcement member has a third easy bending section that is provided at behind the second easy bending section in the vehicle and that is formed with a fragile section.

\* \* \* \* \*